Aug. 27, 1968 — E. W. RHOADES — 3,398,985
MOTOR VEHICLE BODY STRUCTURE
Filed Oct. 31, 1966 — 4 Sheets-Sheet 1
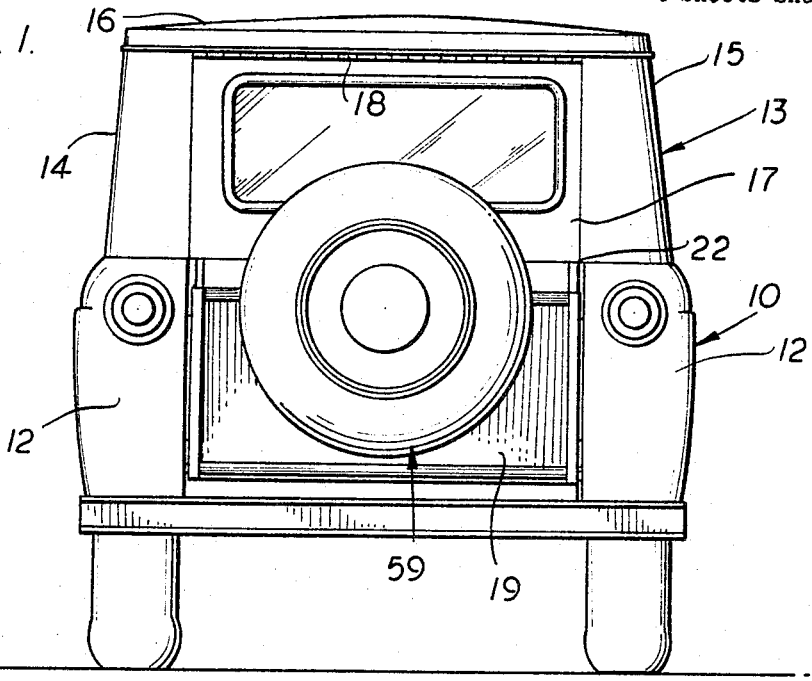
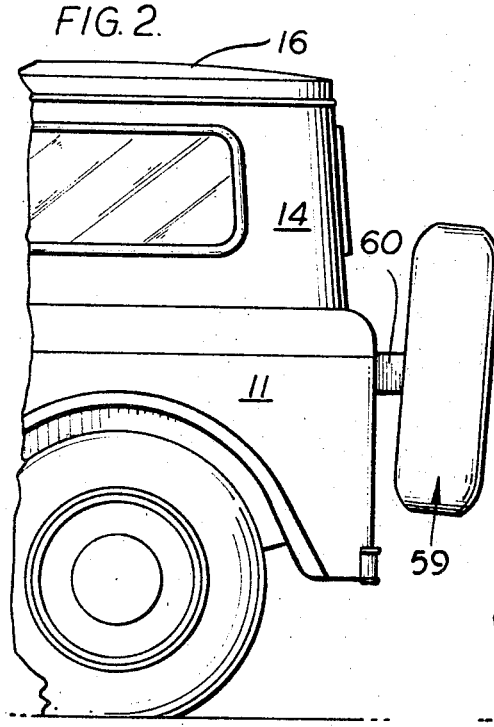
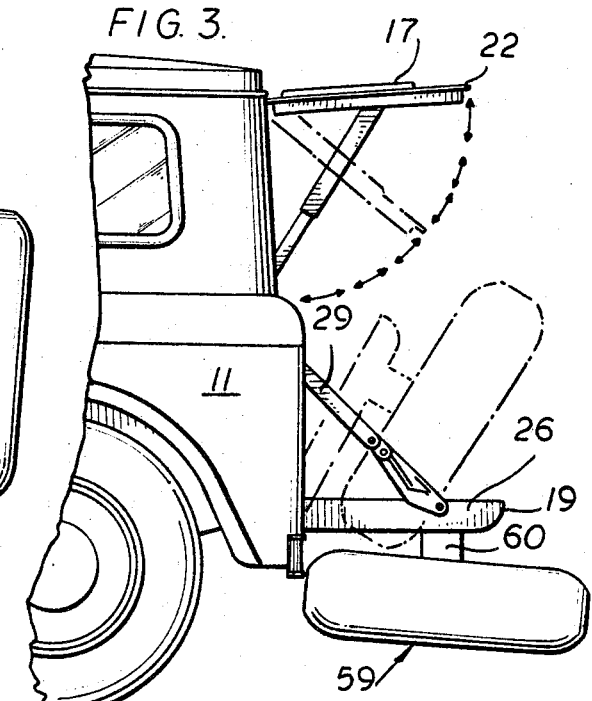
INVENTOR
EDGAR W. RHOADES
ATTY Aug. 27, 1968  E. W. RHOADES  3,398,985
MOTOR VEHICLE BODY STRUCTURE
Filed Oct. 31, 1966  4 Sheets-Sheet 2

INVENTOR
EDGAR W. RHOADES
ATTY

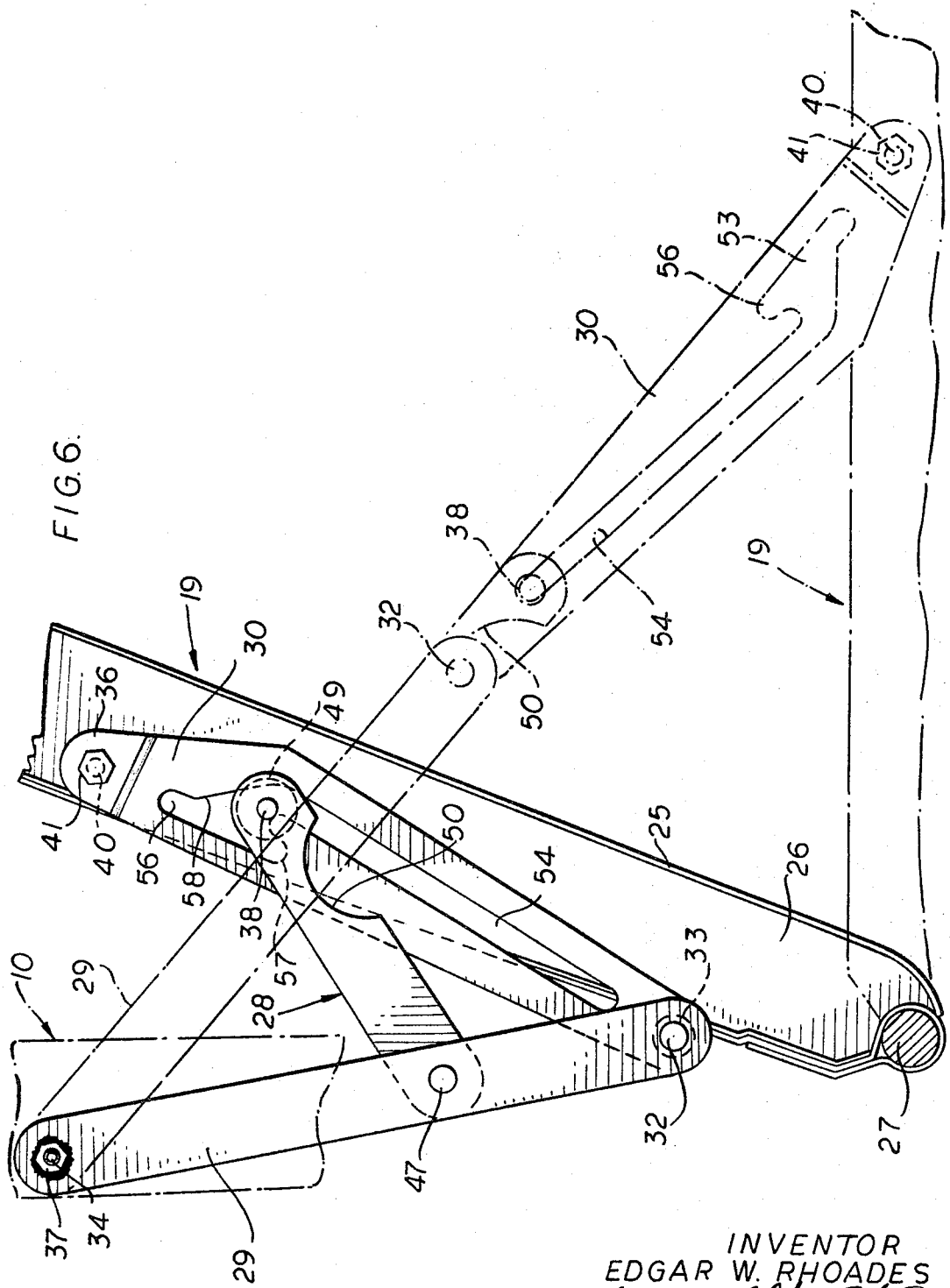

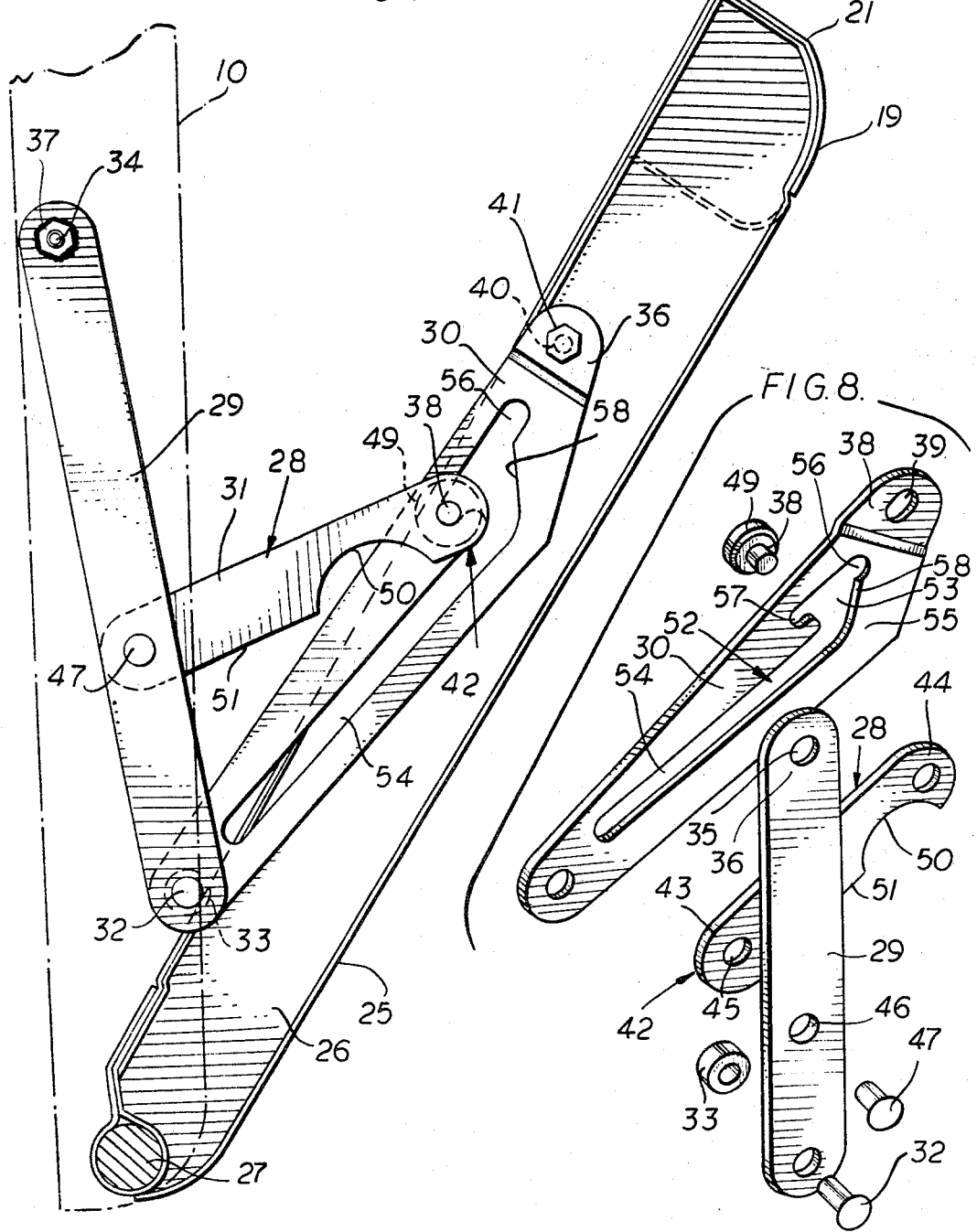

United States Patent Office 3,398,985
Patented Aug. 27, 1968

3,398,985
MOTOR VEHICLE BODY STRUCTURE
Edgar W. Rhoades, Fort Wayne, Ind., assignor to International Harvester Company, Chicago, Ill., a corporation of Delaware
Filed Oct. 31, 1966, Ser. No. 590,859
10 Claims. (Cl. 296—57)

ABSTRACT OF THE DISCLOSURE

Supporting means for the endgate of a motor vehicle body which endgate is capable of swinging about a horizontal axis between a closed position and a full open position. The supporting means includes a pair of articulated links, one of which is pivotally connected to the endgate and the other of which is pivotally connected to the body. A releasable safety catch means is also incorporated into the articulated links which is operable automatically to positively arrest further downward swinging movement of the endgate beyond a partially opened position reached by the endgate pivoting a predetermined arcuate distance from its generally vertical upright, closed position which safety catch means is readily releasable to permit further swinging of the endgate to its horizontally extending, fully opened position. A spare tire and wheel assembly is also adapted to be mounted on the exterior of the endgate so as to be swingable therewith.

---

This invention relates to a motor vehicle body structure and, more particularly, to a new and improved mounting means for endgates of pickup type and station wagon type motor vehicle bodies.

It is common practice in the manufacture of pickup type motor truck bodies as well as station wagon type bodies to provide an endgate structure for closing or at least partially closing the open rear end of the body which endgate structure is capable of being swung about a laterally extending, generally horizontal axis from a vertical upright, closed position to a rearwardly extending, horizontally disposed, fully opened position wherein the endgate is, in effect, a horizontal continuation or extension of the motor vehicle body floor or bed. In order to support the endgate in its fully opened position flexible means, such as chains or the like, extending between the motor vehicle body and the endgate have usually been employed. Consequently, when the endgate is in any position other than the position wherein the endgate is extending horizontally rearwardly and the chains or other support means are taut, the chains are apt to rattle during operation of the motor vehicle. Furthermore, when it was desired to adjust the position of the endgate, it was sometimes necessary to actually manually disconnect or connect the chains from or to the endgate and inasmuch as the chains or other supporting means are continually exposed to the elements, oftentimes after long periods of use difficulty was experienced in connecting and disconnecting the support chains to effect different positioning of the endgate.

In recent years, motor truck body designers have strived to improve the appearance of motor trucks and especially the bodies of pickup trucks and those multi-purpose motor vehicles known as station wagons. Obviously, the supporting chains or other like supporting means heretofore employed in conjunction with endgates adversely affected the overall appearance of the motor vehicle and rendered the body unattractive, especially when the endgate of the body was in its closed position.

It is, therefore, a primary object of the present invention to provide improved endgate supporting means for a motor vehicle body of the pickup type or station wagon type which obviates to a great degree the various functional and appearance shortcomings and disadvantages enumerated above inherent in the design of prior endgate supporting means and which improved endgate supporting means is strong, durable, simple in design, and not likely to get out of order.

A still further object is the provision of an endgate supporting means for a motor vehicle body wherein the supporting means are substantially enclosed and concealed when the endgate is in its generally vertical upright, fully closed position.

Still another object is the provision of an endgate supporting means which is simple to operate and does not require a manual connection or disconnection of the supporting means to effect position adjustment of the endgate and which supporting means will not rattle during operation of the motor vehicle regardless of the position of the endgate.

As is well known, it is customary in the operation of motor vehicles to have a spare tire and wheel assembly available for use in emergencies and, thus, storage means of some sort for carrying the spare tire and wheel assembly must be provided. In the case of pickup type trucks and station wagon type motor vehicles, it has oftentimes been the practice, in order to conserve space and utilize the enclosed body space most efficiently for carrying cargo and/or passengers, to mount the spare tire and wheel assembly on the exterior of the endgate. While storage of the spare tire and wheel assembly on the exterior of the endgate render the same readily accessible and convenient for use, and simultaneously affords maximum utilization of the cargo and passenger carrying space of the vehicle body, such manner of storing the spare tire and wheel assembly has presented the automotive body designer with wholly new problems. Inasmuch as the spare tire and wheel assembly is mounted directly on the endgate and is, therefore, movable in unison therewith, each time the endgate is moved from its generally vertical upright, body closing position to its horizontally extending, fully opened position, the additional weight of the spare tire and wheel assembly must be supported by the operator. Since the center of gravity of the spare tire and wheel assembly is, of necessity, horizontally spaced from the pivotal axis of the endgate, immediately upon unlocking of the endgate lock means provided, there is a tendency for the endgate and spare tire and wheel assembly to swing downwardly by its own weight to its horizontal, fully opened position and if the operator inadvertently fails to exert the necessary counteracting force to control the lowering of the endgate with the spare tire and wheel assembly mounted thereon or lacks the strength to do so, the uncontrolled falling of the endgate could result in personal injury and/or property damage. It is, therefore, a primary object of the present invention to solve the aforementioned problem and to eliminate the possibility of the endgate from falling or swinging downwardly from its closed position to its fully opened position in an incontrolled dangerous manner.

A more specific object of the invention is to provide linkage means operatively interconnecting the vehicle body and the endgate for supporting the endgate in its fully opened, horizontally disposed position which linkage means has incorporated therein a unique safety catch means which is operable automatically to positively arrest further downward swinging movement of the endgate beyond a partially opened position reached by the endgate pivoting a predetermined arcuate distance from its generally vertical upright, closed position which safety means is readily releasable by the operator to permit further swinging of the endgate to its horizontally extending, fully opened position. Consequently, the possibility of the endgate injuring someone or damaging something by swinging downwardly in an uncontrolled, dangerous manner from its closed position to its fully opened position is extremely remote.

In addition to the foregoing, mounting of the spare tire and wheel assembly on the exterior of the endgate sometimes presents still another problem in the case of motor vehicles of the station wagon type. As is well known, the body of motor vehicles of the station wagon type when provided with an endgate swingable about a transversely extending horizontal axis is oftentimes provided with an upper door or closure member which is also swingable between an open position and a closed position about a transversely extending, horizontal axis and the upper closure member and endgate are designed in such a manner that when the upper door and endgate are both in their closed positions, the entire rear opening of the station wagon body is closed. The occasion sometimes arises when it is desired to open the upper closure member or door independently of and leaving the endgate in its closed position. Because of the relative size of the spare tire and wheel assembly utilized in conventional motor vehicles and the disposition of the same on the endgate and in relation to the size and disposition of the upper closure door, the uppermost part of the spare tire and wheel assembly is invariably disposed in the path of swinging movement of closure member when the endgate is in its closed position so as to block the upper closure member or door and prevent it from being swung to its fully opened position. Consequently, it was necessary to either lower the endgate to its fully opened position before the upper closure member was swung to its opened position or to lower the endgate just enough to permit the upper closure member to clear the spare tire and wheel assembly. Obviously, the latter operation was extremely awkward to effect since the endgate and spare tire and wheel assembly had to be supported as the upper closure member was being swung to its fully opened position.

It is, therefore, another important objective of the present invention to avoid the aforementioned difficulties by providing means for supporting the endgate and spare tire and wheel assembly in a partially opened position wherein the uppermost part of the spare tire and wheel assembly is not disposed in the path of swinging movement of the upper closure member so the operator may easily open the upper closure member without the necessity of simultaneously supporting the endgate and spare tire wheel assembly or without first lowering the endgate to its fully opened position.

The foregoing and other important objects and desirable features inherent in and encompassed by the invention, together with many of the purposes and uses thereof, will become readily apparent from a reading of the ensuing description in conjunction with the annexed drawings in which:

FIGURE 1 is a rear elevational view of a motor vehicle embodying the invention, the endgate and upper closure member being shown in their closed positions;

FIGURE 2 is a side elevational view of the rear end portion of the motor vehicle as illustrated in FIGURE 1;

FIGURE 3 is a view similar to FIGURE 2 with the exception that the endgate and the upper closure member are shown in their fully opened positions;

FIGURE 6 is a view similar to FIGURE 4 with the exception that the endgate is in an intermediate or partially opened position, certain broken lines are utilized to show the endgate in its fully opened position and the orientation of certain support linkage means with respect to the endgate when the endgate is in its fully opened position;

FIGURE 7 is also an enlarged side elevational view similar to FIGURE 4 illustrating the endgate in still another partially opened position assumed thereby during the closing operation; and FIGURE 8 is an exploded perspective view of the support linkage means utilized at one lateral end of the endgate.

Figure 4:
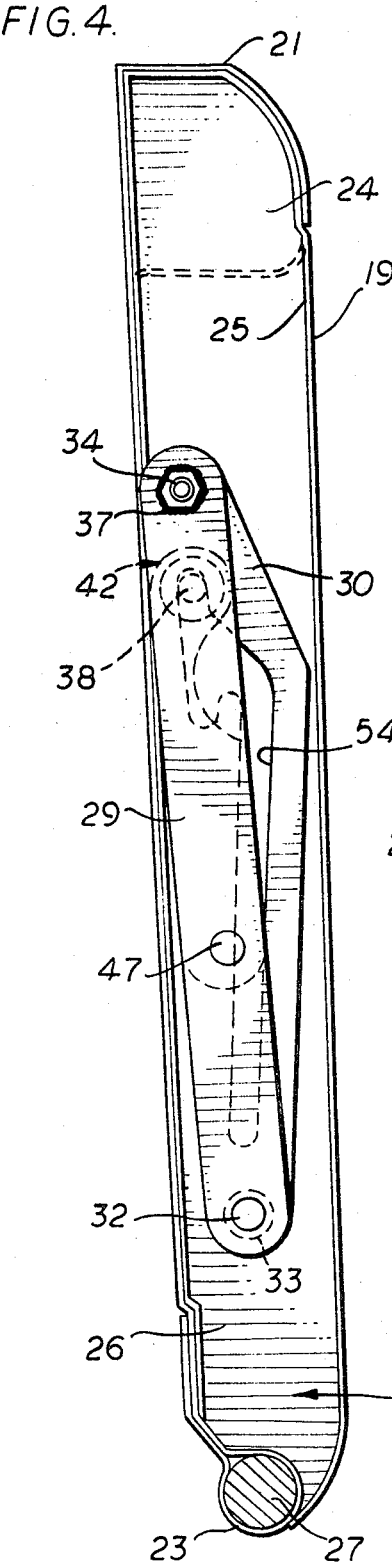
FIGURE 4 is a vertical sectional view of the endgate and certain support linkage means taken substantially along line 4—4 of FIGURE 5, a portion of the body structure broken away to better illustrate the invention, the endgate is illustrated in its fully closed position.

Referring to the drawings in detail, wherein like reference characters represent like elements throughout the various views, the rear portion of a pickup type motor truck body 10 is shown. The body 10 is generally illustrated as having a pair of laterally spaced, vertical side panels 11 which are suitably connected to a generally horizontally extending, load-supporting floor or bed (not shown). Rigidly fastened to or integrally formed with the rearwardmost end of each side panel 11 is a transversely extending rear panel section 12. The rear panel sections 12 are of a double wall construction and the juncture of the outer and inner panels of each rear panel section 12 is suitably reinforced and is formed to provide an offset portion having a generally inwardly facing surface extending vertically between the vehicle body floor and the top surface of the rear panel section 12. The transversely spaced offset portions of the rear panel sections 12 define the transverse sides of an opening at the rear end of the body 10.

As shown in FIGURES 1, 2 and 3, the motor truck body 10 has an enclosure structure 13 mounted thereon which, in effect, converts the motor vehicle into a station wagon type from a pickup type. The enclosure structure 13 includes a pair of transversely spaced, generally vertical side walls 14 and 15, the lowermost edge of each being mounted upon and suitably sealed to the top suface of a respective side panel 11. A generally horizontal roof panel 16 extends between and is suitably connected to the side walls 14 and 15. The rear end of the enclosure structure 13 is open and is adapted to be closed by a generally rectangularly shaped closure member or door 17. Hinge means, designated by reference character 18, are provided for connecting the uppermost transversely extending edge of the closure member 17, as viewed in FIGURE 1, to the rearwardmost edge portion of the roof panel 16, the pivotal axis of the closure member 17 lying generally in a horizontal plane. The closure member 17 is swingable between a fully closed position, illustrated in FIGURES 1 and 2, wherein the rear opening in the enclosure structure 13 is closed and the closure member 17 is disposed substantially vertically and a fully opened position, illustrated in FIGURE 3, wherein the closure member 17 extends generally rearwardly and horizontally from the rear edge of the roof panel 16.

Preferably the endgate, designated generally by reference character 19, includes a single metal sheet 20 having a generally rectangular shape. The metal sheet 20 may be provided with suitable depressions of ribs (not shown) which serve to strengthen and rigidify the endgate 19. The metal sheet 20 is formed to provide a transversely extending box-like section, the top surface 21 of which is substantially in horizontal alignment with the top surfaces of the rear end panel sections 12 when the endgate 19 is in its closed position, as shown in FIGURE 1. It will also be noted that the transversely extending edge of the closure member 17, spaced and parallel to the hinge means 18, is provided with a projecting flange 22 which is adapted to overlap and operatively engage the transversely extending box-like section of the endgate 19 when the endgate 19 and closure member 17 are in their fully closed positions. It is to be understood that suitable weather stripping means (not shown) are provided for sealing the rear openings in the body 10 and closure structure 13 when the endgate 19 and the closure member 17 are in their closed positions. The normally lower edge of the metal sheet 20 is rolled to provide an open-ended cylindrical bearing 23. Attached as by welding to each lateral edge of the metal sheet 20 is a plate-like end member 24. Each end member 24 is formed so as to provide a laterally projecting flange 25 and an end wall 26 disposed substantially in a longitudinal vertical plane. Each flange 25 is adapted to substantially bridge the space between a respective end wall 26 and the adjacent offset portion of a rear panel section 12 on one side of the vehicle body 10 when the endgate 19 is in its closed position and generally forms a continuation of the outer surface of the outer panel of such rear panel section 12. The end walls 26 serve as the end faces of the endgate 19.

A pivot pin support bracket (not shown) is fastened to each inwardly facing end surface of a rear panel section offset portion adjacent the level of the floor or bed of the truck body 10. Projecting transversely inwardly from the lower end of each support bracket is a cylindrical pivot pin 27 which is integrally formed with or rigidly carried by the bracket and is adapted to project into a respective end of the cylindrical bearing 23. In this manner the endgate 19 is pivotally supported by the body 10 and is swingable about a transversely extending, horizontal axis through the pivot pins 27 disposed adjacent the level of the floor or bed between a fully closed, generally upright vertical position, shown in FIGURE 1, and an opened position wherein the endgate 19 extends horizontally rearwardly, as shown in FIGURE 3. The pivotal axis of the endgate 19 is substantially parallel to the pivotal axis of the closure member 17.

In order to support the endgate 19 in its fully opened, rearwardly extending horizontal position, as shown in FIGURE 3, as well as an intermediate or partially opened position, illustrated in FIGURE 7, an articulated linkage means, designated generally by reference character 28, is employed on one lateral side of the endgate 19 while suitable support means (not shown) operating in conjunction with the articulated linkage means 28 are preferably utilized on the opposite lateral side of the endgate 19. It is to be understood that such suitable support means which are not shown could include a pair of links each having one end pivotally connected to a respective end of the other link and its opposite end pivotally connected to either a respective end wall 26 of the endgate 19 adjacent the normally upper end thereof or the offset portion of a respective rear panel section 12. The constructional details of the articulated links which are not shown and which are disposed on one side of the endgate 19 form no part of the present invention. However, it is to be understood that articulated linkage means 28 of the form disposed on one side of the endgate 19 and which is to be described hereinafter in detail could be utilized at both lateral sides of the endgate 19 without departing from the spirit and scope of the invention.

Figure 5:
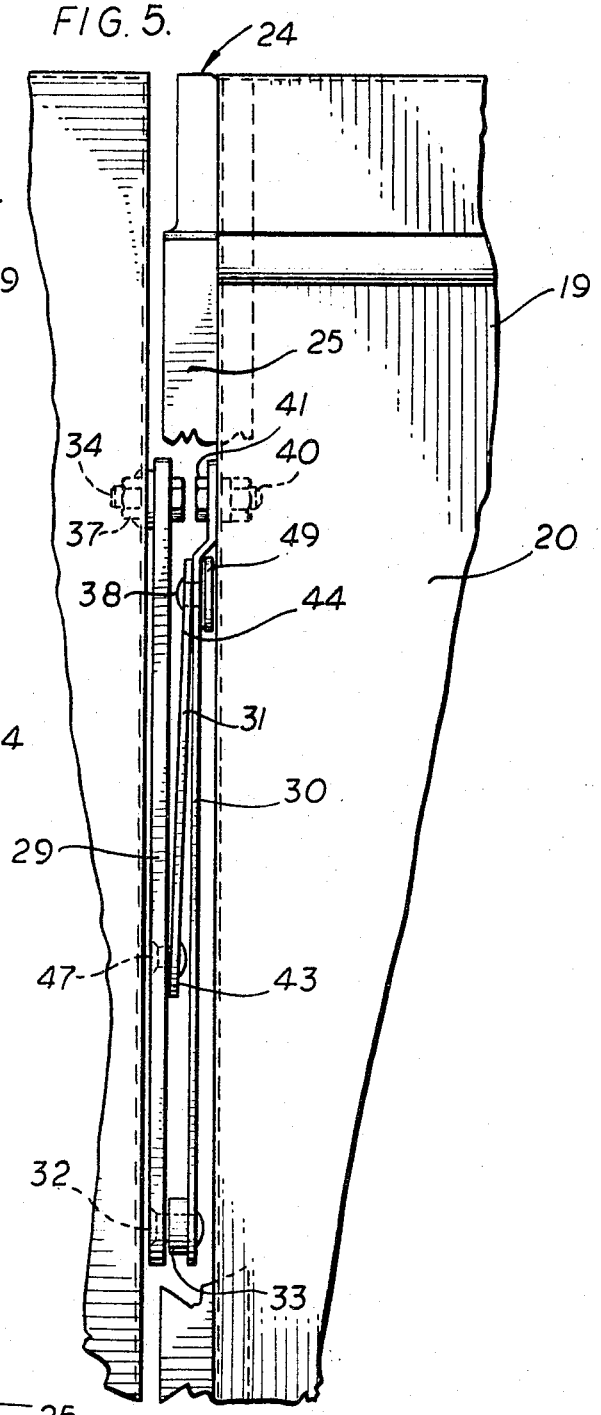
FIGURE 5 is an enlarged end elevational view of one lateral end portion of the endgate and the support linkage means utilized to connect such lateral end portion to the motor vehicle body structure.

As best illustrated in FIGURES 5, 6, 7 and 8 the articulated linkage means 28 includes three elongated links 29, 30 and 31 which are operatively connected together and to the endgate 19 and truck body 10 in a manner which will be pointed out presently. The links 29 and 30 are of substantially the same overall length. One end of the link 29 is pivotally connected to a respective end of the link 30 by means of a pivot pin 32. A spacer element 33 encircling the pivot pin 32 is interposed between the links 29 and 30. The articulated linkage means 28 is pivotally connected to the body 10 by means of a bolt 34 adapted to extend loosely through an aperture 35 formed in the end portion 36 of the link 29 remote from the pivot pin 32 and be threaded into a nut 37 welded to the concealed side of the offset portion inwardly facing surface of a respective rear panel section 12, as shown in FIGURE 5. Referring to FIGURE 8, it will be noted that the end portion 38 of the link 30 remote from the pivot pin 32 is offset and lies in a plane spaced in a general plane of the link 30. The offset end portion 38 is provided with an elongated aperture 39 therethrough, the longitudinal axis of which is perpendicular to and intersects the longitudinal axis of the pivot pin 32. A bolt 40 is adapted to extend loosely through the elongated aperture 39 formed in the end portion 38 and be threaded into a nut 41 welded to the concealed or inwardly facing side of the end wall 26 on one side of the endgate 19. The nut 41 is positioned on the endgate 19 in such a manner that the bolts 34 and 40 are in substantially transverse alignment when the endgate 19 is in its fully closed position, as illustrated in FIGURE 5. From the foregoing, it will be appreciated that the connection provided by the bolt 40 and elongated aperture 39 permits the link 30 to move along the longitudinal axis of the aperture 39 with respect to the endgate 19 as well as to permit the link 30 to pivot about the axis of the bolt 40 with respect to the endgate 10. It will also be appreciated from the foregoing that when the links 29 and 30 are fully extended and arranged end-to-end, as shown in FIGURE 3, the endgate 19 is firmly supported in its fully opened position. Conversely, when the endgate 19 is in its fully closed position and the links 29 and 30 are folded, the links 29 and 30 substantially overlie one another and are disposed in the space between the offset portion inwardly facing surface of a respective rear panel section 12 and the adjacent end wall 26 of the endgate 19. Consequently, the links 29 and 30 are substantially concealed and protected from the elements by the end member flange 25 when the endgate 19 is in its fully closed position and do not distract from the ornamental appearance of the vehicle.

As stated hereinbefore, one of the primary objectives of the present invention is to provide a safety catch means which is operable automatically to positively arrest downward swinging movement of the endgate 19 beyond a particular partially opened position which is reached by the endgate 19 pivoting a predetermined arcuate distance from its generally vertical upright, closed position. The safety catch means, designated generally by reference character 42, includes link 31. As best illustrated in FIGURE 5, the end portion 43 and 44 are offset slightly in opposite directions from the general plane of the link 31 with the result that the end portions 43 and 44 lie, respectively, in planes spaced and substantially parallel with respect to each other. The offset end portion 43 is provided with an aperture 45 which is registerable with an aperture 46 formed through the link 29 intermediate its ends. The link 31 is interposed between the links 29 and 30 and a pivot pin 47 extending through the aperture 45 of the end portion 43 and the intermediate aperture 46 of the link 29, is utilized to pivotally connect the links 29 and 31 together. A spring washer (not shown) is preferably sandwiched in between the links 29 and 31 and encircles the pivot pin 47 for preventing any undue looseness between the links which looseness could result in rattling of the parts during operation of the motor vehicle. The offset portion 44 of the link 31 carries a pin 48, the pin 48 projecting substantially normally of the general plane of the end portion 44 and the free end thereof being provided with an enlarged head 49. The link 31 is also provided with a generally arcuate recess 50 which extends from one longitudinal edge 51 thereof and is spaced adjacent to the offset end portion 44. The purpose of the recess 50 will be pointed out hereinafter.

In addition to the link 31, the safety catch means 42 includes guide track means, designated generally by numeral 52, in the form of a plurality of slots 53, 54 and 55 provided in the link 30. The slot 53 has a length substantially greater than its width and is oriented in such a manner that its longitudinal axis intersects and is perpendicular to the longitudinal axes of the pivot pin 32 and the bolt 40. It will also be appreciated that the width of the slot is equal to or slightly larger than the diameter of the pin 48. One end of the slot 53 is adjacent the offset end portion 38 of the link 30. The elongated slot 54 has a length considerably greater than the slot 53 but has the same width as the slot 53. The slot 54 like the slot 53 is relatively straight and extends from a point adjacent to the end of the link 30 remote from the offset end portion 38 and lying substantially on a line extending perpendicular to the longitudinal axis of the pivot pin 32 and containing the longitudinal axes of the slot 53 and elongated aperture 39. The opposite end of the slot 54 opens into one end of the connecting slot 55 which is relatively short in length and the opposite end of the slot 55, in turn, opens into one longitudinally extending edge of the slot 53. As a result, the surfaces of the link 30 defining each end of the slot 53 and which surfaces are disposed on respective opposite sides of the opening of the slot 55 therein serve as pockets 56 and 57, respectively, for receiving the pin 48 in different positions of adjustment of the endgate 19 as will be pointed out hereinafter. It will also be noted that a straight edge portion 58 of the link 30 partially defining an edge of the connecting slot 55 has one end at the pocket 56 and its opposite end smoothly curved and merged into a longitudinal edge partially defining the slot 54, as clearly illustrated in FIGURE 7. When the articulated linkage means 28 is assembled, the enlarged head 49 of the pivot pin 48 is disposed on one side of the link 30 and the link 31 is disposed on the opposite side thereof with the pin 48 extending through the link 30 by way of the slots 52, 53 and 54. It will be appreciated that the area of the enlarged head 48, in comparison with the size and shape of the opening provided by the slots 53, 54 and 55, is such that it bridges the slots 53, 54 and 55 regardless of the position of the pin 48 and, consequently, inadvertent disconnection of the links 31 and 30 is prevented.

As best shown in FIGURES 1, 2 and 3, the spare tire and wheel assembly, designated generally, by reference character 59, is mounted on the exterior of the endgate 19 so as to be readily available for use in emergencies and to conserve and utilize the space within the body 10 most efficiently. A suitable bracket 60 rigidly bolted or otherwise secured to the endgate 19 substantially midway between the side panels 11 is provided. Although not shown, the spare tire and wheel assembly 59 is detachably secured to the bracket 60 by conventional vehicle wheel stud and nut means. From the foregoing, it will be appreciated that the entire weight of the spare tire and wheel assembly 59 is carried by the endgate 19 and the center of gravity of such additional weight is spaced longitudinally rearwardly from the pivotal axis of the endgate 19 in all positions thereof. Consequently, there is a tendency for the endgate 19 to swing toward its fully opened position from its fully closed position once the endgate latch means (not shown) are released. In order to prevent the uncontrolled falling of the endgate 19 which could result in personal injury and/or property damage in the event the operator failed to exert the necessary counteracting force to control the lowering of the endgate 19 with the spare tire and wheel assembly 59 mounted thereon or lacks the strength to do so, is rendered substantially impossible by virtue of the articulated linkage means 28. During normal operation of the motor vehicle with the endgate 19 in its fully closed position, as illustrated in FIGURE 2, the articulated linkage means 28 is in its folded condition with the links 29, 30 and 31 disposed in an overlapping relationship alongside a respective end wall 26 of the endgate 19 and adjacent the inwardly facing surface of a respective rear panel section offset portion. When the links 29, 30 and 31 are in this overlapping relationship, the pin 48 is disposed in the pocket 56 at one end of the slot 53. As the endgate 19 is swung from its fully closed position illustrated in FIGURE 4, the links 29 and 30 commence to pivot with respect to each other about pivot pin 32 and unfold and simultaneously the pin 48 travels longitudinally along the length of the slot 53 until it reaches the pocket 57. When the pin 48 is disposed within the pocket 57 further downward swinging movement of the endgate 19 is arrested as illustrated in FIGURE 7 since the links 29 and 30 are prevented from moving angularly with respect to each other. The links 29 and 30, when the endgate 19 is in this position, are angularly oriented an angle less than 90°. Thus, if the operator should fail to control the downwardly swinging movement of the endgate 19 for any reason endgate 19 will not swing all the way to its fully opened position but rather will be automatically and positively stopped by the safety catch means 42 after swinging a predetermined arcuate distance from its fully closed position.

In order to release the safety catch means 42 to permit further lowering of the endgate 19 to its fully opened position, illustrated by broken lines in FIGURE 6, the operator merely has to apply a slight force on the endgate 19 tending to swing the same towards its fully closed position while simultaneously swinging the link 31 about the pivot pin 47 to lift the pin 48 out of the pocket 57 and guide the same into the connecting slot 55. Thereafter, as the endgate 19 is lowered the pin 48 enters and slides longitudinally in the slot 54 while the links 29 and 30 unfold further until the endgate 19 is in its fully lowered position. When the endgate 19 is in its fully lowered position, the pin 48 is disposed at the end of the slot 54 adjacent to the pivot pin 32, and the bolts 34, 40, pivot pin 32 and pin 48 lie substantially in a common, transversely extending inclined plane and the links 29 and 30 are fully extended and are arranged end-to-end. It will also be noted that by virtue of the arcuate recess 50 formed in the longitudinal edge 51 of the link 31, the longitudinal axis of the link 31 is substantially coincident with the longitudinal axes of the links 29 and 30 when the links 29 and 30 are extending end-to-end. It will also be appreciated that when the endgate 19 is in its fully opened position, the bolt 40 is at one end of the elongated aperture 39 which aperture end is the closest to the pocket 56.

When it is desired to swing the endgate 19 from its fully opened position to its fully closed position, the operator applies a slight lifting force on the endgate 19 to cause the bolt 40 to move to the end of the elongated aperture 39 of the link 30 spaced the farthest from the pocket 56. Once this is done, the operator may readily apply a generally downward force to the articulated linkage means 28 in the vicinity of the pivot pin 32, which force will cause the links 29 and 30 to readily commence folding with respect to each other. As additional lifting force is applied to the endgate 19, the pin 48 moves longitudinally along the slot 53 and the links 29 and 30 continue to fold or move angularly with respect to each other. When the endgate 19 has been swung to the position illustrated in FIGURE 6, the pin 48 is guided by the edge 58 defining one side of the slot 55 toward the pocket 56 and when the endgate 19 is in its fully closed position, the pin 48, as stated hereinbefore, is disposed within the pocket 56 and the links 29, 30 and 31 are in their folded, overlapping relationship.

As stated hereinbefore, in those vehicles of the station wagon type wherein the spare tire and wheel assembly 59 is mounted on the endgate 19 and the body also includes an upper closure member or door 17 swingable between an open position and a closed position about a transversely extending horizontal axis, the uppermost part of the spare tire and wheel assembly 59 is generally disposed in the path of the swinging movement of the upper closure member when the endgate 19 is in its closed position because of the relative size of the spare tire and wheel assembly 59 and the disposition of the same on the endgate 19 in relation to the size and disposition of the upper closure member or door 17. The lowermost part of the spare tire and wheel assembly 59 generally does not depend below the level of the pivotal axis of the endgate 19 when the endgate is in its closed position so that no interference between the spare tire and the wheel assembly 59 and the vehicle body and rear bumper is encountered when the endgate 19 is in its fully open position. Referring to FIGURES 1 and 2, it will be appreciated that when the endgate 19 is in its fully closed position, the uppermost part of the spare tire and wheel assembly 59 is in the path of swinging movement of the closure member 17. Consequently, the upper closure member 17 is prevented from being swung to its fully opened position with the endgate 19 in its fully closed position. In order to avoid the necessity of completely lowering the endgate 19 to its fully opened position before the upper closure member 17 is swung to its fully opened position, the articulated linkage means 28 permits the endgate 19 to be swung to its partially opened position, illustrated in FIGURE 7, wherein the pin 48 is disposed within the pocket 57 and the uppermost part of the spare tire and wheel assembly 59 is out of the path of the swinging movement of the upper closure member 17 but yet is firmly and safely supported in such partially opened position by the articulated linkage means 28 so as to permit the operator to easily swing the closure member 17 upwardly to its fully opened position without the necessity of simultaneously supporting the endgate 19 and the spare tire and wheel assembly 59.

The embodiment of the invention chosen for the purposes of illustration and description herein is that preferred for achieving the objects of the invention and developing the utility thereof in the most desirable manner, due regard being had to resisting factors of economy, simplicity of design and construction, and the improvements sought to be effected. It will be appreciated therefore that the particular structural aspects emphasized herein are not intended to include but rather to suggest such other adaptations and modifications of the invention as fall within the spirit and scope of the invention as defined in the appended claims.

What is claimed is:

1. In a motor vehicle body having a rectangular endgate mounted thereon for swinging movement about a horizontal axis extending transversely of the body through one edge of said endgate between a closed, generally vertical upright position and a fully opened, generally horizontal position, the combination including said body and endgate, comprising selectively adjustable endgate support means for supporting said endgate in said fully opened position and an intermediate position wherein said endgate is disposed in a plane angularly oriented a predetermined angular distance from a transverse vertical plane containing the pivotal axis of said endgate including a pair of elongated, articulated links having its ends pivotally connected to said body and said endgate, respectively, at points radially spaced from the pivotal axis of said endgate, said links being angularly movable with respect to each other between a folded, substantially overlapping relationship corresponding to said closed position of said endgate and a fully extended, end-to-end relationship corresponding to said fully opened position of said endgate, said support means including releasable safety catch means, said safety catch means including stop means carried by one of said links, said stop means being effective during relative angular movement of said links as said endgate is swung from its closed position toward its fully opened position to automatically and positively arrest further relative angular movement of said links beyond a predetermined angular relationship wherein said links are angularly oriented with respect to each other a predetermined number of degrees less than 90° and said angular relationship of said links corresponds to the intermediate position of said endgate, said stop means being ineffective to arrest relative angular movement of said links as said endgate is swung from its intermediate position toward its closed position.

2. In a motor vehicle body as set forth in claim 1, wherein said releasable safety catch means includes link means carried by one link of said pair of articulated links, said releasable safety catch means further including means operably connecting said link means to the other of said links of said pair of articulated links and including said stop means.

3. In a motor vehicle body as set forth in claim 2, wherein said link means includes a third link having one end pivotally connected to said one link of said pair of articulated links intermediate its ends, and said means operably connecting said link means to said other of said links of said pair of articulated links includes a pin carried by the opposite end portion of said third link and projecting from one side thereof, and guide track means carried by said other of said links of said pair of articulated links for receiving said pin, said pin being slidable with respect to said other link of said pair of articulated links and guided by said track means between first, second and third positions corresponding to the closed, intermediate and opened positions, respectively, of the endgate, said guide track means including said stop means in the form of a pocket for receiving said pin and preventing relative sliding movement between said pin and said other of said links of said pair of articulated links in one direction, said pin being in its second position when disposed in said pocket.

4. In a motor vehicle body as set forth in claim 3, wherein said pocket is longitudinally spaced intermediate the ends of said other of said links of said pair of articulated links.

5. In a motor vehicle body as set forth in claim 1, wherein said motor vehicle body includes an enclosure structure having a rectangular closure member mounted thereon for swinging movement about a horizontal axis extending transversely of the body through one edge of said closure member between a closed, generally vertical position and a fully opened rearwardly extending position, the pivotal axes of said closure member and said endgate being vertically spaced apart and substantially parallel, the lowermost edge of said closure member when in its closed position operably engaging the uppermost edge portion of said endgate when said endgate and said closure member are in their closed positions, and further including a spare tire and wheel assembly mounted on the exterior side of said endgate, said tire and wheel assembly being disposed above the pivotal axis of said endgate and having an uppermost portion thereof disposed above the uppermost edge portion of said endgate when in its closed position and in the path of swinging movement of said closure member when said closure member is swung between its closed and opened positions, said spare tire and wheel assembly being out of the path of swinging movement of said closure member as said closure member is swung between its closed and fully opened positions when said endgate is in its intermediate position.

6. In a motor vehicle body as set forth in claim 5, wherein said releasable catch means includes a third link having one end pivotally connected to a first link of said pair of articulated links intermediate its ends, a pin carried by the opposite end portion of said third link and projecting from one side thereof, and guide track means carried by the second link of said pair of articulated links for receiving said pin, said pin being slidable with respect to said second link of said pair of articulated links and guided by said guide track means between first, second and third positions corresponding to the closed, intermediate, and opened positions, respectively, of the endgate, said guide track means including said stop means in the form of a pocket for receiving said pin and preventing relative sliding movement between said pin and said second link of said pair of articulated links, said pin being in its second position when disposed in said pocket.

7. In a motor vehicle body as set forth in claim 6, wherein said pocket is longitudinally spaced intermediate the ends of said second link of said pair of articulated links.

8. In a motor vehicle body as set forth in claim 7, wherein one end of said second link of said pair of articulated links is pivotally connected to said endgate and said guide track means carried by said second link of said pair of articulated links includes an elongated first slot formed through said second link, the longitudinal axis of said first slot lying in a plane containing the pivotal axes of relative pivotal movement between said first and second links and between said second link and said endgate, one end of said first slot serving as said pocket, and said guide track means further including an elongated second slot having one end longitudinally spaced from said pocket and disposed substantially in the aforementioned plane, said pin being disposed at said one end of said second slot when in its third position corresponding to the opened position of said endgate.

9. In a motor vehicle body as set forth in claim 8, wherein said guide track means further includes a connecting slot formed through said second link, said connecting slot opening into one longitudinal edge of said first slot and its opposite end opening into the end of said second slot remote from said end of said second slot disposed in the aforementioned plane.

10. In a motor vehicle body as set forth in claim 9, wherein the end of said first slot remote from said pocket defines a second pocket for receiving said pin, said pin being in its first position corresponding to the opened position of said endgate when disposed in said second pocket.

References Cited
UNITED STATES PATENTS

| | | | |
|---|---|---|---|
| 1,171,555 | 2/1916 | Swanson | 292—263 |
| 2,071,203 | 2/1937 | Hubbs | 292—263 |
| 2,264,382 | 12/1941 | Keller | 217—60 |
| 2,433,169 | 12/1947 | Stephenson et al. | 224—42.21 |
| 2,631,880 | 3/1953 | Vigmostad | 292—263 |
| 2,773,278 | 12/1956 | Atwood et al. | 16—141 |
| 3,064,846 | 11/1962 | Thomas | 292—263 |

BENJAMIN HERSH, *Primary Examiner.*

R. SONG, *Assistant Examiner.*